United States Patent [19]

Hayakawa

[11] Patent Number: 5,376,242
[45] Date of Patent: Dec. 27, 1994

[54] METHOD OF CLEANING WATER AND APPARATUS THEREFOR

[76] Inventor: Hideo Hayakawa, 2656-12, Moriya-ko, Moriya-machi, Kita-soma-gun, Ibaraki-ken, Japan

[21] Appl. No.: 112,805

[22] Filed: Aug. 27, 1993

[30] Foreign Application Priority Data

Jun. 28, 1993 [JP] Japan ................... 5-156722

[51] Int. Cl.$^5$ ............................................. C02F 1/461
[52] U.S. Cl. ................... 204/149; 204/228; 204/231; 204/267; 204/271
[58] Field of Search ............... 204/149, 131, 228, 231, 204/267, 271

[56] References Cited

U.S. PATENT DOCUMENTS 3,767,046 10/1973 Hartkorn ........................ 204/149
4,140,609 2/1979 Zucker ........................... 204/180 R Primary Examiner—John Niebling
Assistant Examiner—Arun S. Phasge
Attorney, Agent, or Firm—Nikaido, Marmelstein, Murray & Oram

[57] ABSTRACT

There are provided a method and apparatus for cleaning contaminated water, for instance in lakes, marshes, rivers and waste water reservoirs in factory site. A set of fiat electrodes is immersed in the water, which electrode set includes a pair of voltage application electrodes made of relatively high electrolysis capability material and a grounding electrode placed in the vicinity of the voltage application electrode. An alternating current voltage of relatively high frequency is applied to the pair of voltage applying electrodes to give an electric power to the water. A degree of quality of resulting water is determined as an index a measured value of oxidation-reduction potential of the water.

3 Claims, 4 Drawing Sheets

METHOD OF CLEANING WATER AND APPARATUS THEREFOR

BACKGROUND OF THE INVENTION

1. Field of the Invention

The present invention relates to a method of cleaning contaminated water by charging electrical energy to the water in lakes, rivers, marshes or waste water reservoirs in factory sites, and an apparatus therefor.

The term "cleaning" in this specification is defined as decrease of oxidation-reduction potential (ORP), turbidity, smell, chemical oxygen demand (COD), phosphate concentration as well as increase in amount of dissolved oxygen in the water.

2. Related Art

Nowadays water in lakes, rivers and others has been contaminated with waste from general homes, factories, golf links and other sources to cause a serious public pollution.

Hitherto, an aeration treatment has been well known for cleaning the water in lakes and others, which has been widely employed for treating sewage. The aeration treatment is effected by blowing fresh air into contaminated water and/or sucking-up contaminated water in depth layer to expose the same to atmospheric air.

With recourse to such aeration treatment, however, an economically inhibited huge installation would be required for cleaning of water in lakes or marshes, and such mechanical water cleaning would be limited to relatively small areas, and the treatment of whole water in lakes or marshes would be almost impossible. The degree of contamination is determined in terms of turbidity, offensive smell, content of dissolved oxygen, chemical oxygen demand, phosphate concentration and other factors. The mechanical water cleaning can improve the quality of water in terms of selected items only.

In contrast to such mechanical water cleaning, an electrical water treatment is found to be useful in treating a relatively small amount of water, for instance for the purpose of improving quality of drinking water such as city water, well water and the like, but conventional electrical water cleaning methods and apparatuses are practically useless in treating a lot of badly contaminated water in lakes and others. Therefore, there has been an ever increasing demand on practical water cleaning method and apparatus to be applied to contaminated water in lakes and others for improving human life environment.

SUMMARY OF THE INVENTION

An object of the invention is to provide an electrical method which is capable of cleaning a lot of contaminated water in lakes, marshes, rivers and others without causing any adverse effect to aquatic animals and plants, requiring a low electric power.

Another object of the invention is to provide an apparatus for carrying out the method, which is simple in structure, and can be constructed and maintained with reasonable cost.

The present invention is based on the finding that contaminated water in lakes and others can be cleaned with good efficiency by electrically reducing oxidation-reduction potential of the water to be treated.

According to the invention, the first object can be attained by a method for cleaning contaminated water, which comprises the steps of arranging with a distance a pair of voltage application electrodes in the water to be treated, the electrodes being made of a material of relatively high electrolysis capability; placing at least one grounding electrode in the vicinity of said voltage application electrodes in the water; and applying an alternating current voltage relatively high frequency to the voltage application electrodes, thereby reducing oxidation-reduction potential of the water.

The high frequency alternating current voltage may be produced by converting direct current voltage from a direct current voltage source into the same, and in this case, a portable battery may be used as the direct current voltage source, whereby the method according to the invention can be carried out in any place, even if at the place where no commercial electricity is available.

When a pair of grounding electrodes are arranged in the water and one of them is alternatively connected to the earth with a relatively low cycle, deposition of foreign substances on the grounding electrodes can be restrained, whereby it keeps effectiveness over extended period of time.

A water cleaning apparatus according to the invention comprises a floatable casing having a hollow body and a lid; a flat electrode set secured on side wall of the casing and comprising a pair of voltage application electrodes made of relatively high electrolysis capability material arranged laterally side by side, and a pair of flat grounding electrodes arranged oppositely to the voltage application electrodes at equi-distances from the opposing grounding electrodes; and a control box accommodated in the casing, electrically connected to the electrode set through wirings, and comprising a first and second high-frequency switching means connected to a direct current voltage source via an associated variable resistor for converting the direct current voltage to alternating current voltage of relatively high frequency and for applying the so converted alternating current voltage to the voltage application electrodes, a high-frequency switching command circuit having a flip-flop circuit to give high-frequency switching command signals to the first and second high-frequency switching means via an associated resistor, and a high-frequency oscillator to give high-frequency signals to the high-frequency switching command circuit.

The flat electrode set may be secured on each of four side walls of the floatable casing. An upper flange of the casing body has an edge area extending outwardly and downwardly, which is useful to prevent entrance of water into an inner space of the hollow body, conjointly with the lid with circumferential area having a form corresponding to that of the flange of floatable casing.

When an alternating current voltage is applied to the pair of voltage application electrodes submerged in the water to be treated such as a lake, marsh, river, factory waste reservoir or the like, value of oxidation-reduction potential of water shall be reduced to about −600 mV in a relatively short period of time. Almost all organic materials in the water are decomposed into gas, and the remainder agglomerates to cause precipitation. The voltage application electrodes are liable to be heated by application of alternating current voltage thereto to raise the temperature of the surrounding water, thereby causing a convection of water near the electrodes. In case that the water temperature is below 15° C., value of the oxidation-reduction potential shows little or no decrease. Since the temperature of the water surrounding the electrodes rises as referred to, however, however, decrease of the oxidation-reduction potential of water can be recognized, even if the water temperature is below 15° C.

An experience, wherein city water colored with a dye-stuff and having oxidation-reduction potential of 500 mV was treated as referred to above, showed that the water was discolored, when the oxidation-reduction potential decreased near the value of −600 mV.

There is almost no reliable means to verify what phenomena have caused on the water, for instance in water molecules, by applying high-frequency alternating current voltage thereto, but in any event, the results of water cleaning can be determined in terms of turbidity, offensive smell, content of dissolved oxygen, chemical oxygen demand, phosphate concentration and other factors. Particularly, the degree of water quality can be estimated in terms of the value of oxidation-reduction potential. The contaminated water can be cleaned with decrease of its oxidation-reduction potential.

When the apparatus according to the invention is put in operation, the high-frequency switching command circuit responds to high-frequency signals from the high-frequency oscillator to provide switching command signals to the first and second high-frequency switching means, thereby permitting these switching means to close and open alternately so that the direct current voltage from the direct current voltage source may be converted to the high-frequency alternating current voltage, which is applied to the pair of voltage application electrodes, alternately.

DESCRIPTION OF THE PREFERRED EMBODIMENTS

Figure 1:
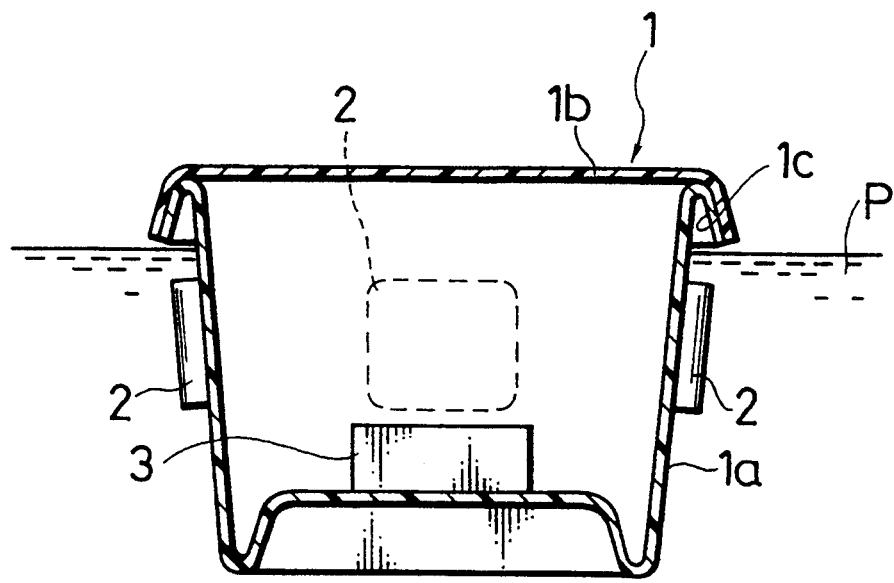
FIG. 1 is a vertical section of a water cleaning apparatus according to the invention.

Referring to FIG. 1, a water cleaning apparatus according to the invention comprises a box-like casing 1 floatable on water P, flat electrode sets 2, which are secured on the outer surface of the four side walls of the casing 1, and a control box 3 accommodated in the casing 1.

The floatable casing 1 is made of a reinforced synthetic resin material, and is composed of a box-like hollow body 1a and a lid 1b for closing upper open end of the body. A circumferential flange at upper open end of the body 1a is bent outwardly and downwardly to form a circumferential overhanging edge 1c to prevent entrance of water into the inner space of body, and a circumferential edge of lid 1b is bent inwardly so as to be complementary with the overhanging edge 1c of body 1.

Figure 2:
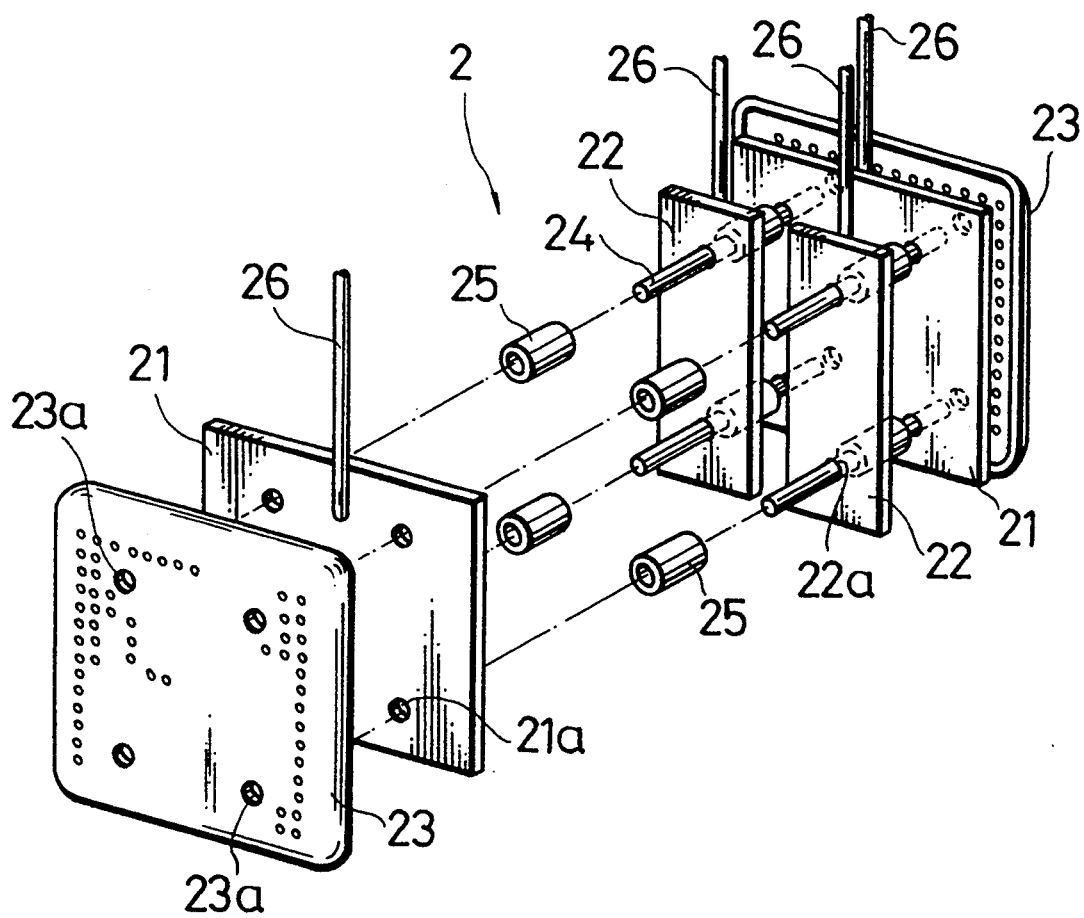
FIG. 2 is an exploded perspective view of a electrode set used for the apparatus.
Figure 3:
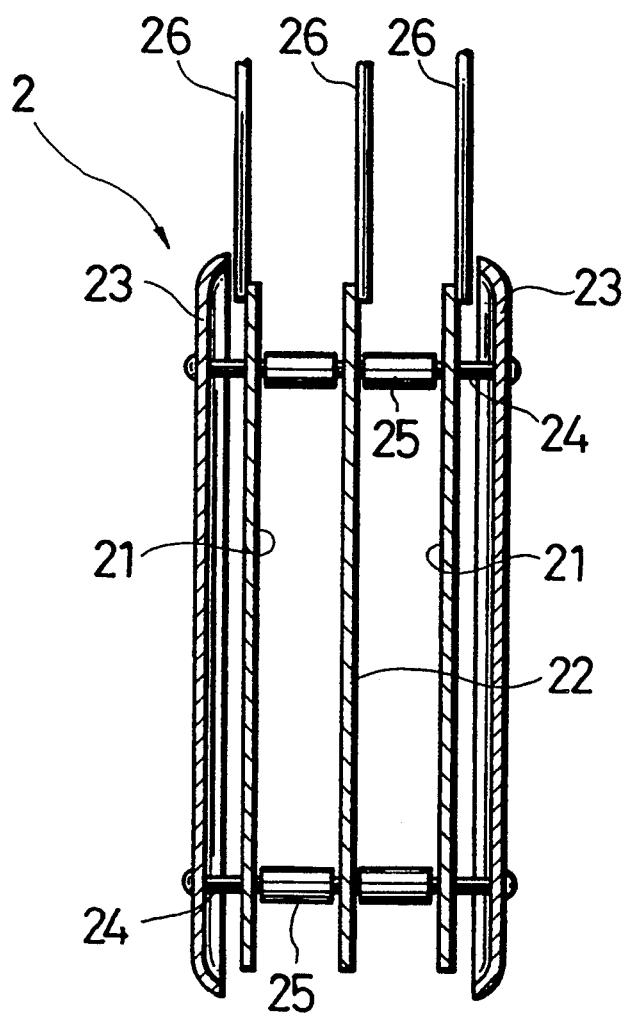
FIG. 3 is a vertical section of the electrode set.

As seen from FIGS. 2 and 3, the electrode set 2 comprises a pair of grounding electrodes 21, 21 of stainless-steel place and arranged oppositely, a pair of flat zinc voltage application electrodes 22, 22 arranged laterally side by side at the equi-distances from each grounding electrode, and a pal, of perforated protection plates 23, 23 placed on the outside of each grounding electrode 21. All electrodes 21, 22 and protection plates 23 are assembled by connecting rods 24 made of electric insulation material and passing through apertures 21a, 22a and 23a of the electrodes 21, 22 and protection plates 23, and the grounding electrodes 21 and the voltage application electrodes 22 are separated by tubular spacers 25 made of electrical insulation material. For instance, the distance between the opposing grounding electrodes is set by about 80 mm, and that between the voltage application electrodes 22, 22 is set by about 30 mm laterally from each other. The perforated protection plate 23 was subjected to anti-rusting treatment. In this embodiment, the zinc plates were employed for the voltage application electrodes, but another plate of lithium oxide, magnesium alloy, copper, iron, stainless-steel or the like of relatively high electrolysis capability may be used.

Each electrode 21 or 22 is connected to a titanium rod 26 which passes through an aperture (not shown) formed in the side wall of the body 1a to be connected to an electric circuit (FIG. 4) accommodated in the control box 3.

Figure 4:
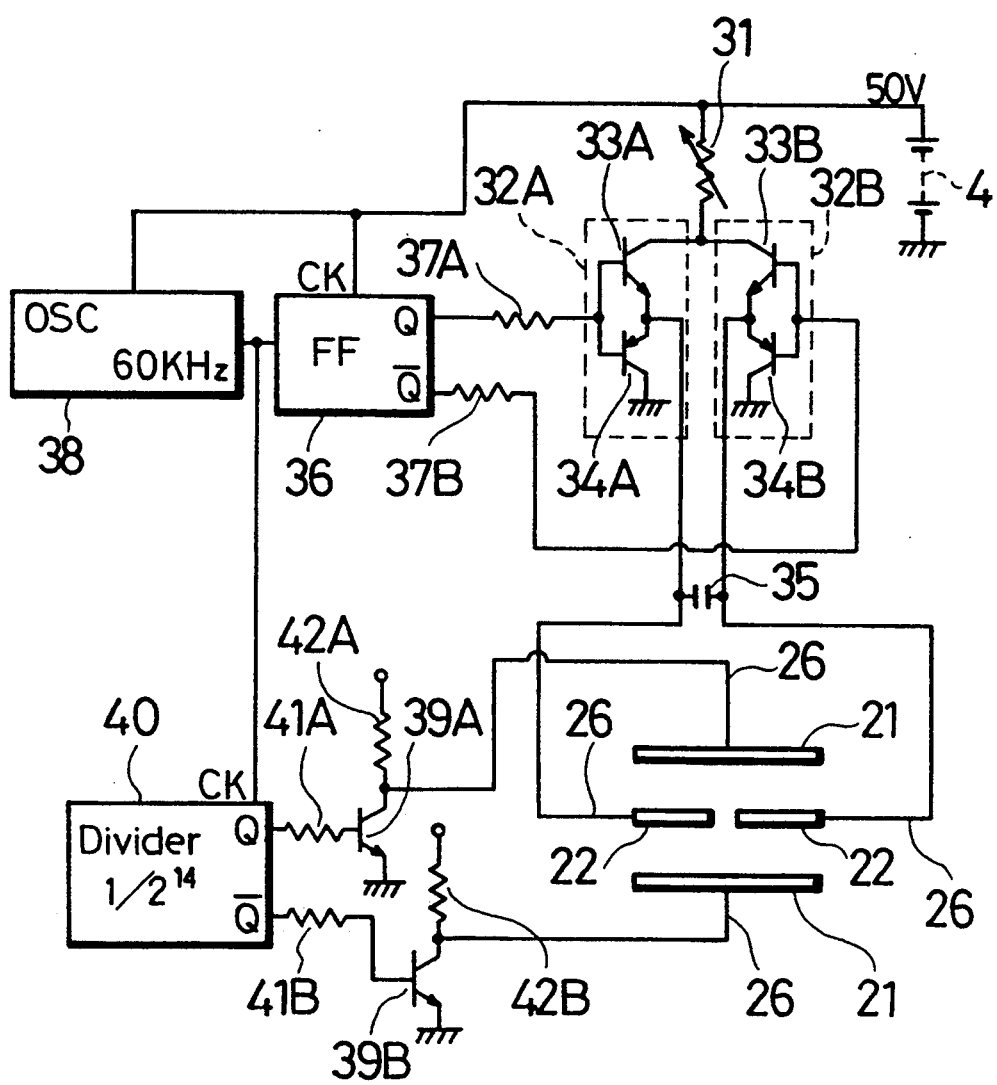
FIG. 4 is an electric circuit for the apparatus.

FIG. 4 shows the electric circuit arranged in the control box 3. As shown, first and second high-frequency switching means 32A and 32B are connected between an exterior direct current voltage source 4 (50 V) and the voltage application electrodes 22, 22 via a variable resistor 31 for converting direct current voltage from the voltage source to alternating current voltage to be applied to the voltage application electrodes 22, 22 alternately. Each switching means 32A or 32B is composed of transistors 33A, 34A or 33B, 34B. A capacitor 35 is connected between voltage application electrodes 22, 22.

To the first and second high-frequency switching means 32A and 32B, a common high-frequency switching command circuit 36 is connected through associated resistor 37A or 37B, which circuit comprises a flip-flop circuit to give high-frequency switching command signals to the first and second high-frequency switching means 32A and 32B. A high-frequency oscillator 38 is connected to the high-frequency switching command circuit 36 for providing signals of 60 KHz thereto.

The first and second low-frequency switching means 39A and 39B are connected to the grounding electrodes 21, 21 to allow these electrodes to be grounded alternately at a relatively low cycle. A low-frequency switching command circuit 40 is connected to these low-frequency switching means 39A and 39B via associated resistors 41A, 41B. The low-frequency switching command circuit 40 is connected to the high-frequency oscillator 38, so that the high-frequency signal from the oscillator 38 shall be divided for instance by $\frac{1}{4}^{14}$ for applying the so divided signal to the low-frequency switching means 39A and 39B.

Resistors 42A and 42B are connected to the low-frequency switching means 39A, 39B respectively, to connect its collector to plus side of the direct current voltage source to keep the grounding electrodes 21, 21 at positive potential, when these low-frequency switching means 39A, 39B are turned off.

In use, the box-like floatable casings 1 as many as required for the purpose are anchored at suitable places in a lake or the like, and associated switches are turned on. For example, each apparatus with four electrode sets (see FIGS. 1 and 2) has an ability for cleaning contaminated water of about 1 ton/day with consumption of 600 watts. Accordingly, the number of required apparatuses can be determined for performing the cleaning the in a lake or the like.

Figure 5:
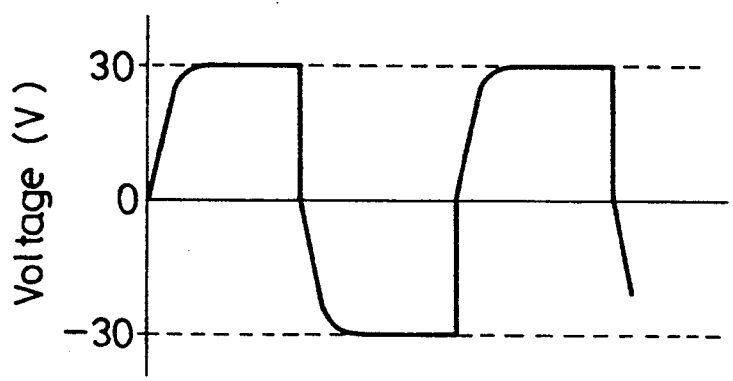
FIG. 5 is a wave form of high-frequency alternating current voltage to be applied to the voltage application electrodes of the apparatus.
Figure 6:
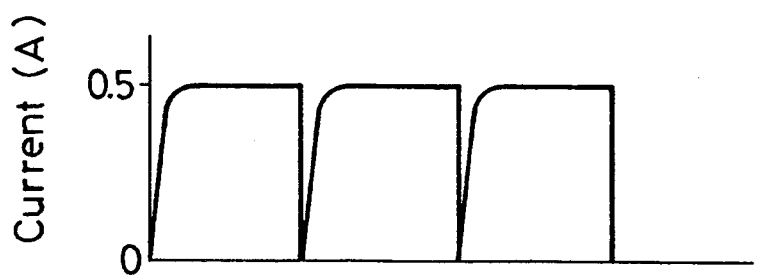
FIG. 6 is a wave form of direct current voltage flowing through the grounding electrodes of the apparatus.

In operation, when associated switches are turned on, the high-frequency oscillator 38 is put in operation, directing high-frequency signals to the high-frequency switching command circuit 36 in the form of flip-flop circuit, and then the high-frequency switching command circuit 36 provides high-frequency switching command signals to the first and second high-frequency switching means 32A and 32B alternately, thus allowing these high-frequency switching means 32A and 32B to turn on and off at high frequency. The resulting high-frequency alternating current voltage is applied to voltage application electrodes 22, 22. FIG. 5 shows a wave form of the alternating current voltage appearing between voltage application electrodes 22, 22. The wave height can be controlled by adjusting the variable resistor 31. FIG. 6 shows a wave form of the direct current voltage flowing between the voltage application electrodes 22, 22 and grounding electrodes 21, 21 alternately.

After determining the direction of water circulation in a lake or the like, the floatable water cleaning apparatuses may be advantageously anchored at selected upstream places to allow water to pass therethrough. For cleaning of stagnant contaminated water for instance in ditches, the apparatuses may be moved place to place at a suitable time interval.

Experiment of water cleaning according to the present invention was made with a single electrode set (see FIG. 2) put in contaminated water.

Two portable containers were filled with badly contaminated water (40 liters), which was taken from the Tega-numa (Tega marsh) in Chiba-ken, Japan, particularly around a boat harbor thereof. The water was put in a plastic reservoir in a laboratory. Table 1 shows how the oxidation-reduction potential (ORP) of the water changed with the lapse of time, and how bad smell and visual appearance were improved.

TABLE 1

| Time | ORP (mV) | Smell | Visual appearance |
|---|---|---|---|
| untreated | 330 | fairly bad | |
| 5 min. | 220 | detectable | suspended organic matters can be visually observed |
| 10 min. | −346 | hardly detectable | precipitate of organic and inorganic matters is noted |
| 15 min. | −600 | almost no bad smell | amount of precipitate increased |
| 18 hours. after treatment | −300 | no smell | as clear as city water (thickness of precipitate: about 7 mm) |

As seen from Table 1, the value of ORP decreases, as the water becomes clean-up. It means the value of ORP can be made as an index showing a degree of water cleaning.

Next, measurement results of different items on the water which was left 18 hours after 15 minute-long water cleaning operation according to the present invention are shown in following Table 2.

TABLE 2

| Items | Pre-treatment | Post-treatment | Notes |
|---|---|---|---|
| water temp. | 18° C. | 9° C. | |
| turbidity (degree) | 25 | 2 | measured by turbidity gauge PC-06, Kyoto Denshi Kogyo |
| smell | corrupted | no smell | algae-like smell |
| electric conductivity | 340 | 231 | Yokogawa, SC82 Type |
| dissolved $O_2$ | 9.1 | 11.75 | |
| pH | 8.786 | 7.6 | |
| ORP | 300 mV | −300 mV | Toko Kagaku Kenkyusho, TRX-90 Type |
| COD | 50 ppm | 10 ppm | Central Kagaku HC-407 |
| phosphate | 0.9 ppm | 0.05 ppm | Kyoritsu Kagaku Kenkyusho, F-Type |

As may be understood from the above, the water cleaning method according to the invention permits an effective, economical treatment of lake, marsh or the like contaminated water without requiring a huge installation. The water cleaning apparatus according to the invention permits use of batteries, and therefore, it can be carried out and used everywhere in the field. The apparatus can be used for an extended period of time by alternately connecting its grounding electrodes to earth at a relatively low cycle, thereby preventing deposition of foreign substances thereon. The apparatus prevents invasion of water by the overhanging edge in the circumferential flange at upper open end of the hollow body, which open end is covered with the lid, so that it can be used in wavy places.

I claim:

1. A method for cleaning contaminated water, comprising the steps of:

providing an apparatus for cleaning contaminated water comprising a floatable casing having a hollow body and a lid, a flat electrode set secured on a side wall of the casing, and comprising a pair of voltage application electrodes made of relatively high electrolysis capability material arranged laterally side by side, and a pair of flat grounding electrodes arranged oppositely to the voltage application electrodes at equal distances from the opposing grounding electrodes, and a control box accommodated in the casing and electrically connected to the electrode set through wirings, and including a first and second high-frequency switching means connected to a direct current voltage source via an associated variable resistor for converting the direct current voltage to alternating current voltage and for applying the alternating current voltage to the voltage application electrodes, and a high-frequency switching command circuit having a flip-flop circuit to provide high-frequency switching command signals to the first and second high-frequency switching means via an associated resistor, and a high-frequency oscillator to give high-frequency signals to said high-frequency switching command circuit; said method further comprising the steps of arranging said pair of voltage application electrodes in the water to be treated;

placing at least one of said flat grounding electrodes in a vicinity of said voltage application electrodes in the water; and applying said alternating current voltage to said voltage application electrodes, thereby reducing oxidation-reduction potential of the water.

2. A method according to claim 1, wherein the step of putting at least one grounding electrode in the water includes the step of putting a pair of grounding electrodes in the water, and connecting said pair of grounding electrodes to the earth.

3. A method for cleaning contaminated water as recited in claim 1, further comprising the steps of:

providing each of the four walls of the floatable casing with the electrode set;

providing a circumferential flange at an upper open end of the hollow body, said circumferential flange being bent outwardly and downwardly to form a circumferential overhanging edge, wherein said lid is provided with a circumferential edge in a shape complimentary to the overhanging edge of the hollow body.

* * * * *